(12) United States Patent
Hsu et al.

(10) Patent No.: US 7,434,985 B2
(45) Date of Patent: Oct. 14, 2008

(54) CALIBRATED BUILT-IN TEMPERATURE SENSOR AND CALIBRATION METHOD THEREOF

(75) Inventors: Jen-Shou Hsu, Hsinchu (TW); Bor-Doou Rong, Jhubei (TW)

(73) Assignee: Etron Technology, Inc., Hsinchu (TW)

( * ) Notice: Subject to any disclaimer, the term of this patent is extended or adjusted under 35 U.S.C. 154(b) by 395 days.

(21) Appl. No.: 11/304,881

(22) Filed: Dec. 16, 2005

(65) Prior Publication Data

US 2007/0140308 A1    Jun. 21, 2007

(51) Int. Cl.
*G01K 15/00* (2006.01)
*G01C 25/00* (2006.01)

(52) U.S. Cl. ............................. 374/1; 702/99
(58) Field of Classification Search ........... 374/1; 702/99
See application file for complete search history.

(56) References Cited

U.S. PATENT DOCUMENTS

| | | | |
|---|---|---|---|
| 5,528,520 A * | 6/1996 | Kemp | 702/104 |
| 5,719,378 A * | 2/1998 | Jackson et al. | 219/497 |
| 6,612,737 B1 * | 9/2003 | Lobban | 374/183 |
| 6,695,475 B2 * | 2/2004 | Yin | 374/171 |
| 6,997,606 B2 * | 2/2006 | Marinet et al. | 374/178 |
| 2005/0128118 A1 * | 6/2005 | Devendorf et al. | 341/158 |
| 2005/0270011 A1 * | 12/2005 | Aota et al. | 323/315 |
| 2005/0271115 A1 * | 12/2005 | Takeuchi | 374/1 |
| 2006/0055414 A1 * | 3/2006 | Vincent et al. | 324/617 |
| 2006/0262827 A1 * | 11/2006 | Hsu | 374/1 |
| 2007/0040716 A1 * | 2/2007 | Lin et al. | 341/120 |

* cited by examiner

*Primary Examiner*—Edward Lefkowitz
*Assistant Examiner*—Mirellys Jagan
(74) *Attorney, Agent, or Firm*—Muncy, Geissler, Olds & Lowe PLLC

(57) ABSTRACT

A built-in calibration device is for a temperature sensor. A voltage divider is configured for receiving one reference voltage with a negative temperature coefficient and generating a plurality of input voltages. Comparing apparatus is connected to the voltage divider and configured for generating a plurality of comparing codes based upon another reference voltage with a positive temperature coefficient and the plurality of input voltages. Controlling apparatus is connected to the comparing apparatus and configured for calibrating the temperature sensor based on the plurality of comparing codes.

14 Claims, 6 Drawing Sheets

CALIBRATED BUILT-IN TEMPERATURE SENSOR AND CALIBRATION METHOD THEREOF

BACKGROUND OF THE INVENTION

1. Field of Invention

The present invention is related to a built-in temperature sensor and in particular to a calibrated built-in temperature sensor.

2. Description of Related Art

The emerging market in mobile applications such as mobile phone, personal digital assistants and hand-held personal computers has nourished application-specific DRAM with mobile features attractive to system user seeking a tightened power budget for money. One of the most important criteria in mobile DRAM is the small data retention current. Since the retention time of DRAM cells is strongly dependent on temperature, a temperature sensor may be used to control the refresh period to profile data retaining activities that are just needed for the ambient condition, but the temperature sensor significantly suffers from process variations due to the small temperature coefficient of the sensing elements. Hence, chip-by-chip testing and trimming are inevitable. This difficulty resulting in long test time for the temperature sensor has been a limitation in mass production.

Sweeping the temperature of tester to measure the built-in temperature sensor is a known method that may detect the transition of the temperature sensor. Shown in FIG. 1, if the output voltage transition occurs at T0, the information that the temperature sensor detects the temperature difference between below T0 and above T0 is acquired. Owing to the process variation, the built in temperature sensors have various T0 on various dies. Hence, it is necessary to calibrate them die by die for the precision of temperature sensor. After getting the measured T0 and the target T0 that is gotten by simulation, it is easy to compensate the error that is caused by process corner case.

SUMMARY OF THE INVENTION

It is an objective of the present invention to provide a built-in temperature sensor applied to DRAM and related product thereof. An assembly of comparators associated with circuits is added in help of temperature calibration in the built-in temperature sensor.

It is further an objective of the present invention to provide a calibrated temperature sensor and the method thereof. It is not necessary for the calibrated temperature sensor to change the temperature of the chamber of tester in calibration mode.

It is still further an objective of the present invention to provide a built-in temperature sensor. A series of codes to characterize the built-in temperature sensor are acquired to program the temperature sensor based on the series of codes, which reduces the calibration time.

Accordingly, one embodiment of the present invention provides a built-in calibration device for a temperature sensor. A first reference voltage with a negative temperature coefficient and a second reference voltage with a positive temperature coefficient are generated. The built-in calibration device includes a voltage divider receiving the second reference voltage and generating a plurality of input voltages. Comparing apparatus is connected to the voltage divider and configured for generating a plurality of comparing codes based upon the first reference voltage and the plurality of input voltages. Controlling apparatus is connected to the comparing apparatus and configured for calibrating the temperature sensor based on the plurality of comparing codes.

BRIEF DESCRIPTION OF THE DRAWINGS

This invention will be described with reference to the accompanying drawings, wherein.

DETAILED DESCRIPTION OF THE PREFERRED EMBODIMENT

Figure 1:
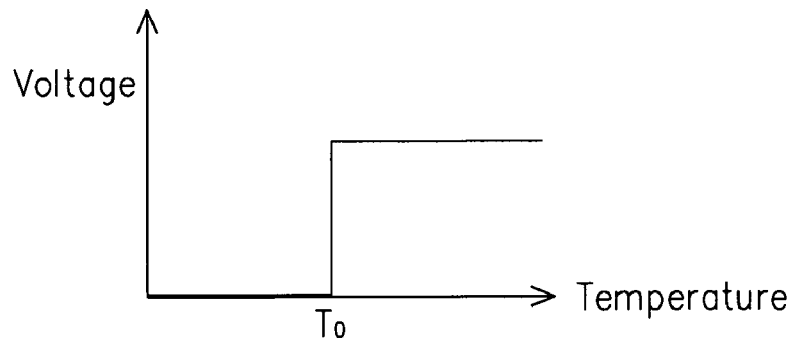
FIG. 1 is a diagram illustrating a digital output voltage transition in relation to temperature in one prior art.
Figure 2:
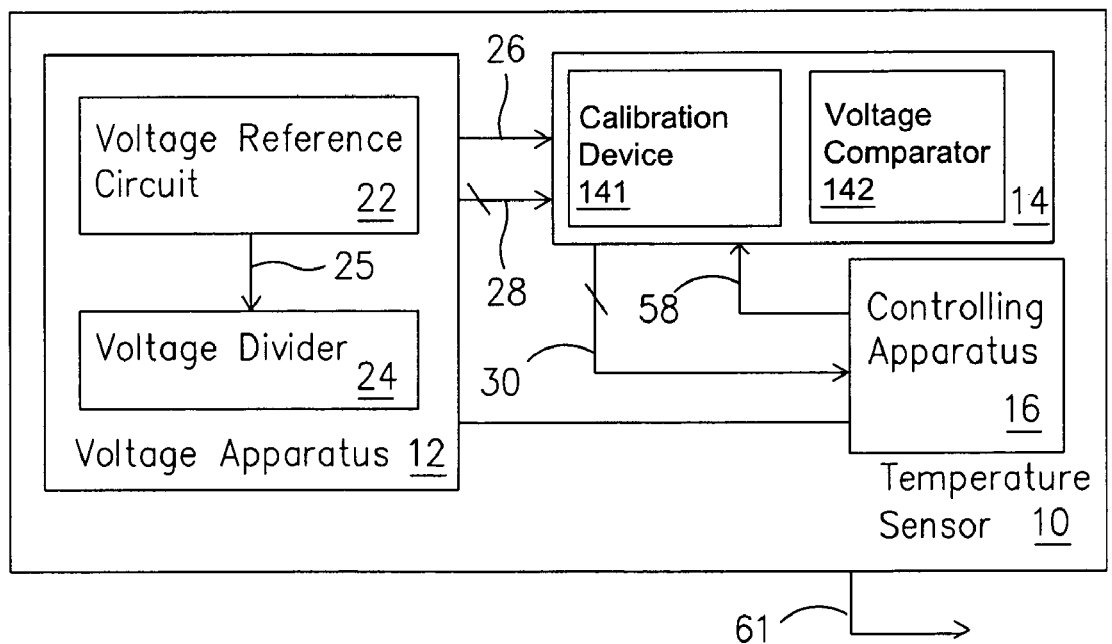
FIG. 2 is a schematic block diagram illustrating an exemplary temperature sensor in accordance with one embodiment of the present invention.

FIG. 2 is a schematic block diagram illustrating an exemplary temperature sensor in accordance with the present invention. A built-in temperature sensor 10 of an electrical device, such as DRAM, is provided with a built-in calibration device for performing a calibration process in a calibration mode. The built-in temperature sensor 10 includes a voltage apparatus 12, a comparing apparatus 14 and a controlling apparatus 16. The voltage apparatus 12 is configured for providing various predefined voltages. In one embodiment, the voltage apparatus 12 includes voltage reference circuit 22 and voltage divider 24, and outputs a first reference voltage 26 and multitudes of input voltages 28. The voltage reference circuit 22 is configured for generating the first reference voltage 26 and a second reference voltage 25 as an input of voltage divider 24. The voltage divider 24 is configured for receiving the reference voltage 25 and generating a series of input voltages 28.

Comparing apparatus 14 is electrically coupled to the voltage apparatus 12 to receive the reference voltage 26 and the series of input voltages 28. In the calibration mode of one embodiment, an assembly of calibration device 141 of the comparing apparatus 14 is configured for comparing each input voltage 28 with the reference voltage 26 to generate multitudes of comparing codes 30. In a normal mode of the embodiment, a voltage comparator 142 of the comparing apparatus 14 may generate a voltage for a designed target temperature. Controlling apparatus 16 is electrically coupled to the comparing apparatus 14 to receive the comparing codes 30. Based on the comparing codes 30 and associated with the voltage divider 24, the controlling apparatus 16 performs the calibration for the built-in temperature sensor 10 in the calibration mode to generate a third reference voltage 58 (an output reference voltage) for the voltage comparator 142 to generate a temperature sensor output 61.

Figure 3A:
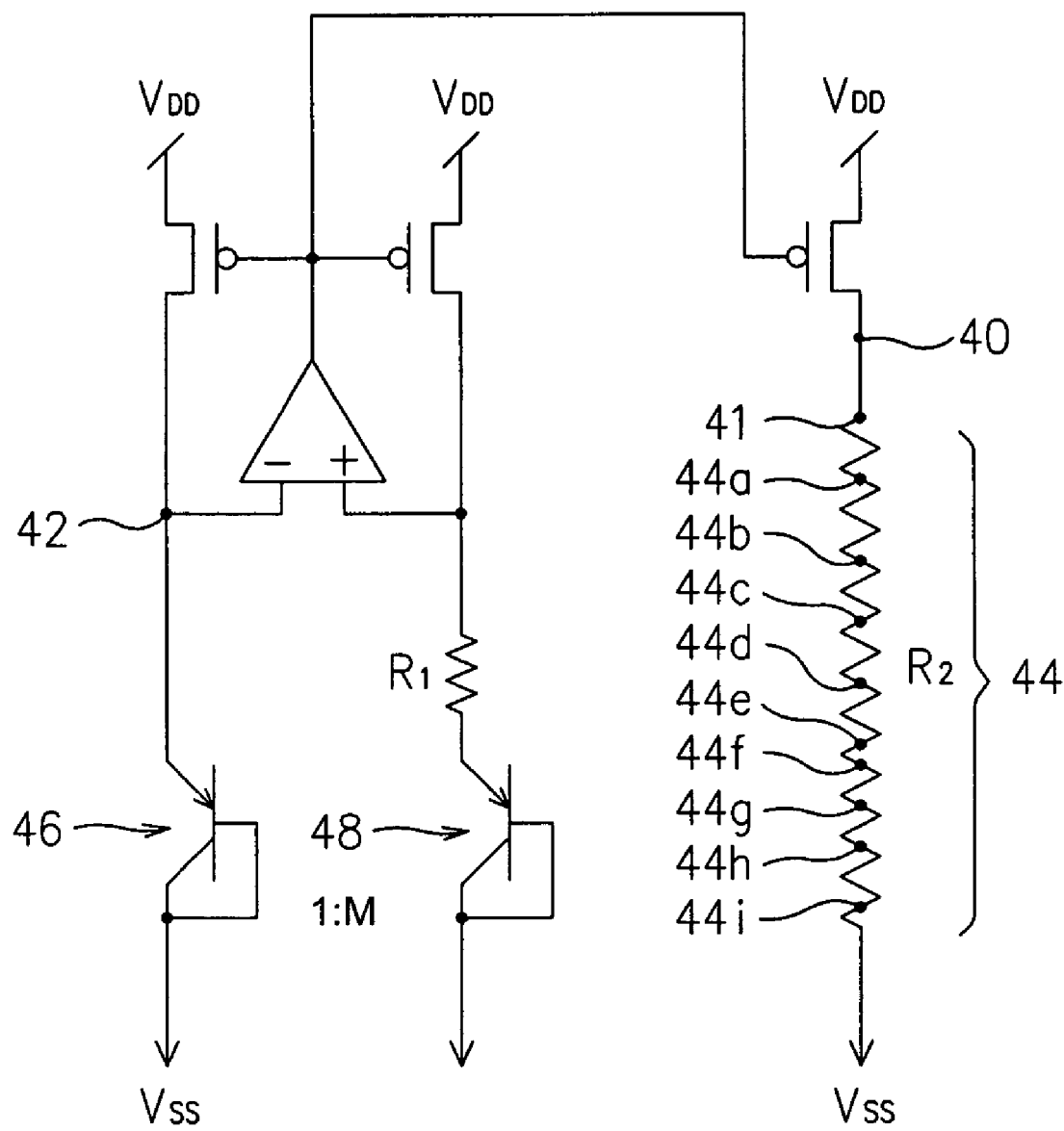
FIG. 3A is a schematic circuit illustrating the exemplary voltage apparatus in the built-in temperature in accordance with one embodiment of the present invention.

FIG. 3A is a schematic circuit illustrating the exemplary voltage apparatus in the built-in temperature sensor in accordance with the present invention. In one embodiment, a first reference voltage Vn (numbered 26 in FIG. 2) is acquired by measuring the voltage at the node 42 of the voltage reference circuit. Generally, the first reference voltage acquired from the node 42 is decreased with increase of temperature, as well as with a negative temperature coefficient. Furthermore, a second reference voltage Vpos (numbered 25 in FIG. 2) is acquired by measuring the voltage at the node 40 and with a first positive temperature coefficient as follows:

$$Vpos = C \times T$$

$$C = (R2/R1) \times (k/q) \times (ln(M))$$

Where T is temperature, C is the first positive temperature coefficient, R2 is the resistance from one terminal 41 of the resistor 44 to Vss, k is Boltzmann constant, q is charge and M is the ratio of p/n junction areas of diode 48 and diode 46 (M is not equal 1 and more than 1 generally).

On the other hand, the voltage divider (not shown in FIG. 3A) receives the second reference voltage from the node 40 and generates a series of input voltages Vpn (numbered 28 in FIG. 2) as follows:

$$Vp_{(n)} = C_{(n)} \times T$$

$$C_{(n)} = (R2_{(n)}/R1) \times (k/q) \times (ln(M))$$

Where $C_{(n)}$ represents the series of positive coefficients. Different from R2, $R2_{(n)}$ is the resistance from, for example, nodes 44a, 44b, 44c, 44d, 44e, 44f, 44g, 44h and 44i of the resistor 44 to Vss, respectively.

Figure 3B:
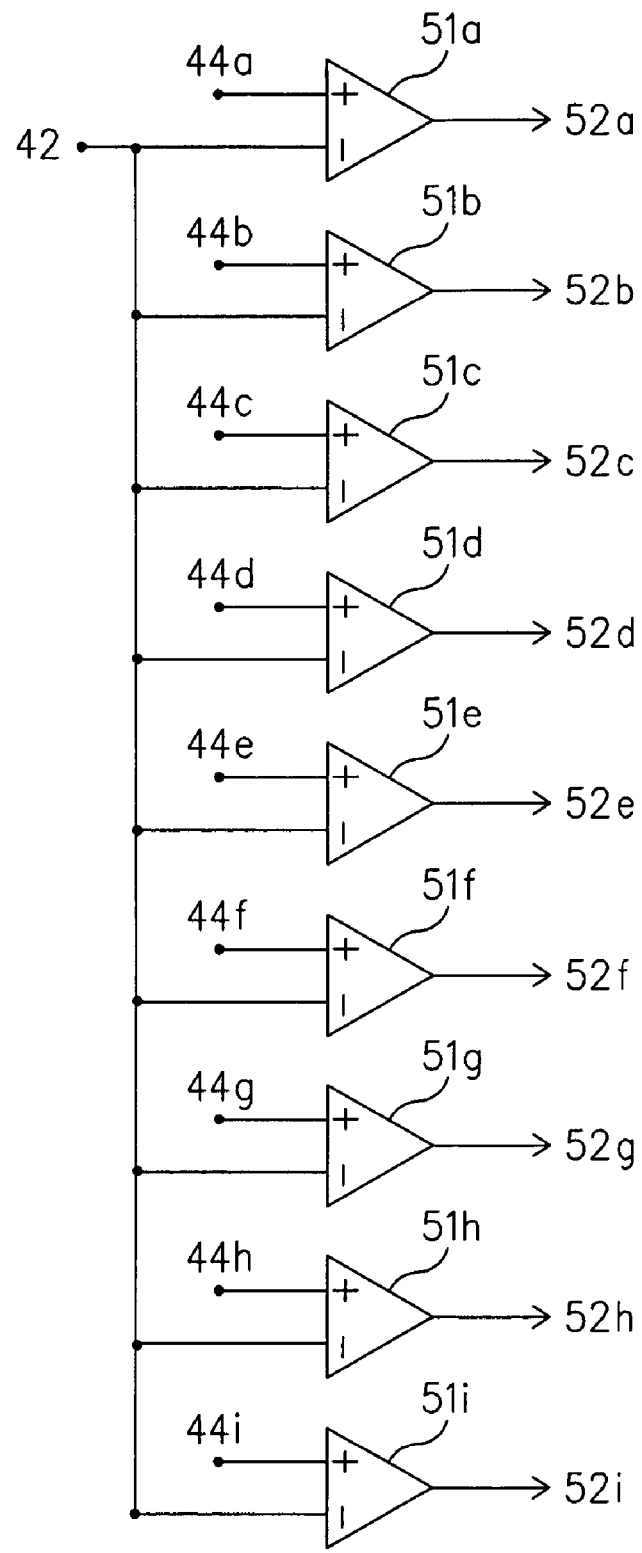
FIG. 3B is a schematic circuit illustrating the exemplary assembly of calibration device of comparing apparatus in accordance with one embodiment of the present invention.

FIG. 3B is a schematic circuit illustrating the exemplary assembly of calibration device of comparing apparatus in accordance with the present invention. The assembly of calibration device includes multitudes of comparators 51a, 51b, 51c, 51d, 51e, 51f, 51g 51h and 51i for example. On one hand, the first reference voltage Vn measured from the node 42 is electrically connected to the inverse terminal as an input of the comparators 51a, 51b, 51c, 51d, 51e, 51f, 51g, 51h and 51i respectively. On the other hand, the series of input voltages $Vp_{(n)}$: Vp1, Vp2, Vp3, Vp4, Vp5, Vp6, Vp7, Vp8 and Vp9 from the points 44a, 44b, 44c, 44d, 44e, 44f, 44g, 44h and 44i are respectively electrically connected the non-inverse terminal as another input of the comparators 51a, 51b, 51c, 51d, 51e, 51f, 51g, 51h and 51i. All output voltages Vt1, Vt2, Vt3, Vt4, Vt5, Vt6, Vt7, Vt8 and Vt9 from the outputs 52a, 52b, 52c, 52d, 52e, 52f, 52g, 52h and 52i constitute the series of comparing codes.

Figure 3C:
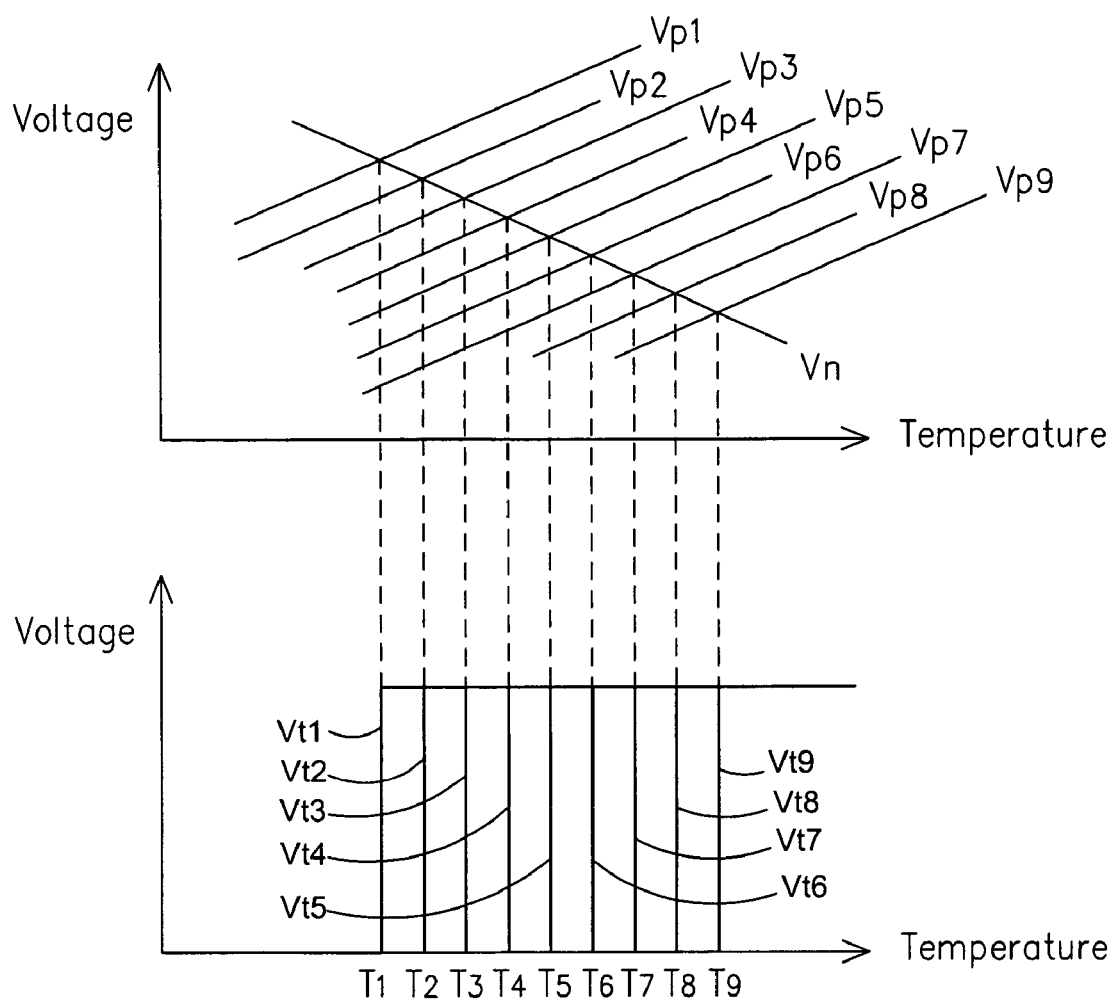
FIG. 3C is a schematic diagram illustrating the output voltage in relation to the temperature in accordance with one embodiment of the present invention.

Depicted as FIG. 3C is the combination diagram of analog output and digital output. The voltages Vp1, Vp2, Vp3, Vp4, Vp5, Vp6, Vp7, Vp8 and Vp9 are increased with increase of temperature and shown in the upper diagram. The voltages Vt1, Vt2, Vt3, Vt4, Vt5, Vt6, Vt7, Vt8 and Vt9 respectively corresponding to Vp1, Vp2, Vp3, Vp4, Vp5, Vp6, Vp7, Vp8 and Vp9 are in the under diagram, and there are output voltage transitions occurring respectively at $T_1, T_2, T_3, T_4, T_5, T_6, T_7, T_8, T_9$. In calibration mode, the comparators 51a, 51b, 51c, 51d, 51e, 51f, 51g, 51h and 51i are turned on. And the comparing codes are acquired in digital format, such as (1,1,1,1, 1,1,1,0,0) from the outputs 52a, 52b, 52c, 52d, 52e, 52f, 52g, 52h and 52i. Generally, "0" means output is low level and "1" means output is high level when the tester is set at a precise target temperature T0. Accordingly, the precise target temperature T0 is located between the temperatures $T_7$ and $T_8$ where the two successive comparing codes change from 1 to 0.

Figure 3D:
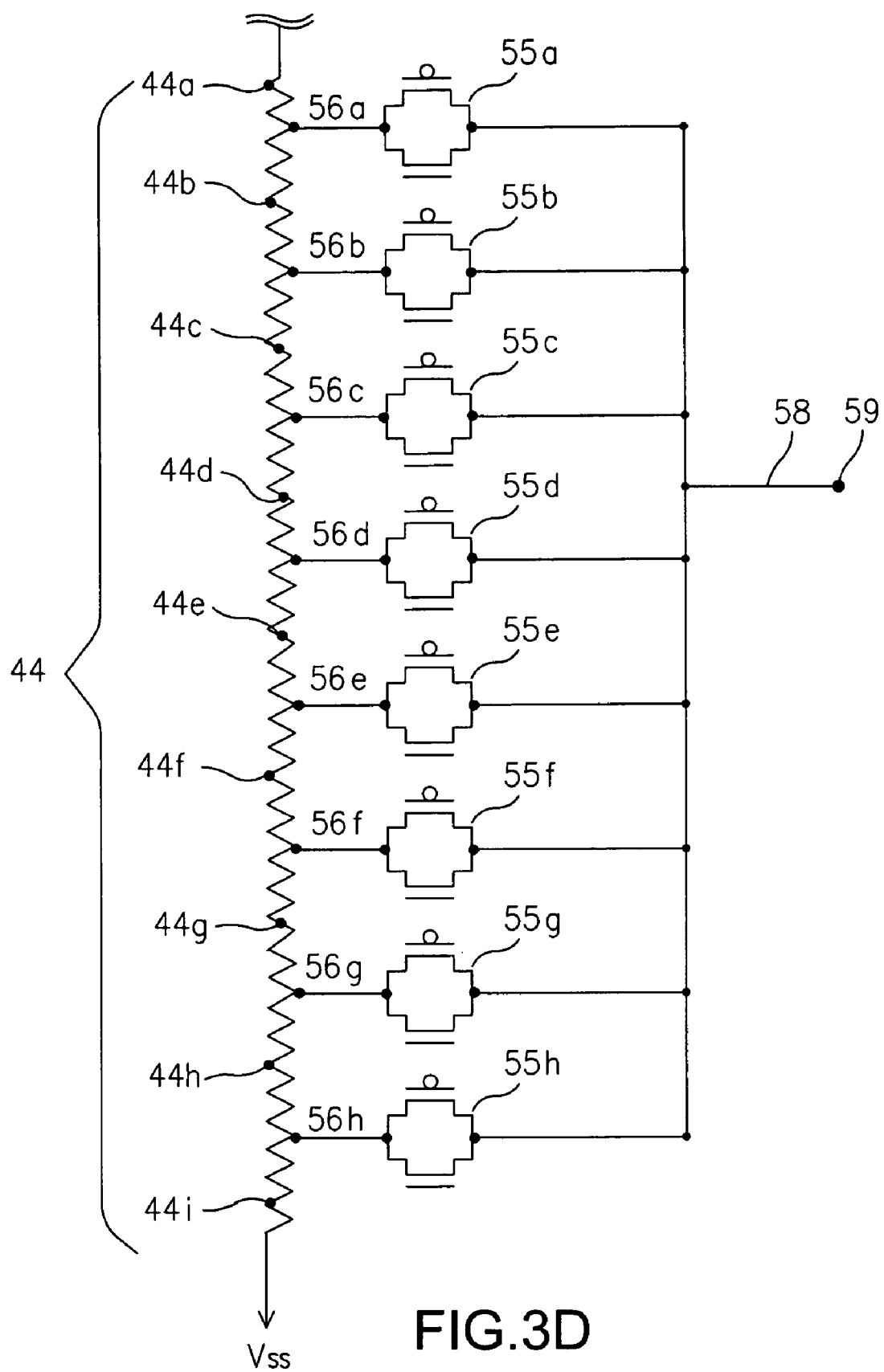
FIG. 3D is a schematic circuit diagram illustrating the exemplary controlling apparatus in accordance with one embodiment of the present invention.

FIG. 3D is a schematic circuit diagram illustrating the exemplary controlling apparatus in accordance with the present invention. There are the nodes 56a, 56b, 56c, 56d, 56e, 56f, 56g and 56h of the resistor 44 are electrically coupled to the node 59 through multitudes of pass gates 55a, 55b, 55c, 55d, 55e, 55f, 55g and 55h, respectively. In one embodiment, for example, the node 56a is located between the nodes 44a and 44b of the resistor 44. Similarly, the node 56b is between the nodes 44b and 44c, the node 56c between the nodes 44c and 44d, etc., as well as the node 56a. Furthermore, the pass gates 55a, 55b, 55c, 55d, 55e, 55f, 55g and 55h function according to the series of comparing codes, in which only of them is turned on to generate a third reference voltage Vp' measured at the node 56a as follows:

$$Vp' = C' \times T$$

$$C' = (R2'/R1) \times (k/q) \times (ln(M))$$

Where C' represents a second positive coefficients in which R2' may be programmed by pass gate 55a, 55b, 55c, 55d, 55e, 55f, 55g or 55h. For example, in the case of the turned-on pass gate 55a, the voltage Vp1' from the node 56a to the node 59 is equal to:

$$Vp1' = (Vp1 + Vp2)/2$$

Figure 3E:
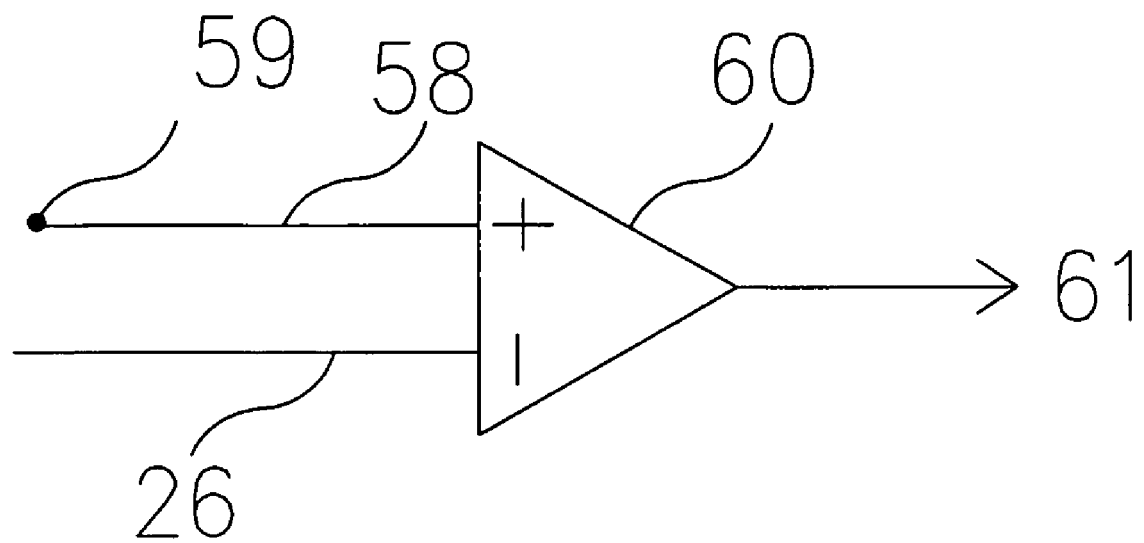
FIG. 3E is a schematic diagram illustrating the exemplary voltage comparator of comparing apparatus in accordance with one embodiment of the present invention.

Similarly, the voltage Vp2' from the node 57a coupled to the node 59 through the turned-on pass gate 55b is Vp2' = (Vp2+Vp3)/2, etc. Thus, R2' may be programmed by one turned-on pass gate 55a, 55b, 55c, 55d, 55e, 55f, 55g or 55h. In the embodiment with the series of comparing codes (1,1, 1,1,1,1,1,0,0), the pass gate 55g is turned-on to generate the third reference voltage Vp7' = (Vp7+Vp8)/2 at the node 59, and other pass gates are turned off. It is advantageous that the third reference voltage Vp' is equal to the average voltage of the two successive input voltages $Vp_{(n)}$ and $Vp_{(n+1)}$ for generating a calibrated temperature of a controllable range of difference from the precise target temperature T0. In the embodiment, the temperature difference in the calibrated temperature and the precise target temperature is within absolute value of $(T_{n+1} - T_n)/2$. Shown in FIG. 3E, in the normal mode operation, the output voltage 58 from the node 59 is as a non-inverse input and the first reference voltage 26 as an inverse input of a comparator 60 to general a temperature sensor output 61 corresponding to a calibrated temperature. Accordingly, after the calibration, the maximum error for a programmed temperature sensor in normal mode is smaller than $(T_8 - T_7)/2$.

Accordingly, one of embodiments of the present invention provides a calibrated built-in temperature sensor. Voltage apparatus is configured for generating a plurality of input voltages and a first reference voltage. Comparing apparatus is connected to the voltage apparatus and generates a plurality of comparing codes based upon the first reference voltage and the plurality of input voltages. Controlling apparatus is connected to the comparing apparatus and configured for calibrating the built-in temperature sensor based on the plurality of comparing codes. A calibration method for a temperature sensor which generates a first reference voltage and a second reference voltage. The second reference voltage is with a first positive temperature coefficient. First, a plurality of input voltages are generated based on the second reference voltage. Each of the plurality of input voltages is compared with the first reference voltage to generate a plurality of comparing codes. The temperature sensor is calibrated based on the plurality of comparing codes.

While the invention has been particularly shown and described with reference to preferred embodiments thereof, it will be understood by those skilled in the art that various changes in form and details may be made without departing from the spirit and scope of the invention.

What is claimed is:

1. A calibrated built-in temperature sensor, comprising:
voltage apparatus, the voltage apparatus generating a plurality of input voltages and a first reference voltage;
comparing apparatus connected to the voltage apparatus and generating a plurality of comparing codes based upon the first reference voltage and the plurality of input; and a controlling apparatus connected to the comparing apparatus and calibrating the built-in temperature sensor based on the plurality of comparing codes; wherein the comparing apparatus includes:
a plurality of comparators for a calibration mode corresponding to the plurality of input voltages, each of the plurality of comparators receiving the first reference voltage and the corresponding one of the plurality of input voltages to generate the plurality of comparing codes: and
a normal-mode comparator for receiving the first reference voltage and an output reference voltage from the controlling apparatus.

2. The calibrated built-in temperature sensor according to claim 1, wherein the plurality of comparing codes are in digital format.

3. The calibrated built-in temperature sensor according to claim 1, wherein the calibrated temperature sensor has a calibrated temperature and the difference between the calibrated temperature and a target temperature is within a controllable range.

4. The calibrated built-in temperature sensor according to claim 1, wherein the voltage apparatus comprises:
a voltage reference circuit for generating the first reference voltage and a second reference voltage, the second reference voltage being with a first positive temperature coefficient; and
a voltage divider receiving the second reference voltage and generating the plurality of input voltages.

5. The calibrated built-in temperature sensor according to claim 4, wherein the voltage divider comprises a first resistor, a plurality of resistors and a last resistor, all of which being connected in series, and at least one of the plurality of input voltages being generated from a connecting point of two successive ones of the plurality of resistors.

6. The calibrated built-in temperature sensor according to claim 5, wherein the controlling apparatus comprises a plurality of gates corresponding to the plurality of resistors, the plurality of gates being controlled by the plurality of comparing codes to calibrate the built-in temperature sensor.

7. The calibrated built-in temperature sensor according to claim 6, wherein only one of the plurality of gates is turned on to generate a third reference voltage with a second positive temperature coefficient, wherein the calibrated temperature is dependent on the third reference voltage.

8. A built-in calibration device for a temperature sensor, the temperature sensor generating a first reference voltage and a second reference voltage, the second reference voltage being with a first positive temperature coefficient, the built-in calibration device comprising:
a voltage divider receiving the second reference voltage and generating a plurality of input voltages, wherein the voltage divider comprises a first resistor, a plurality of resistors and a last resistor, all of which are connected in series, and at least one of the plurality of input voltages being generated from a connecting point of two successive ones of the plurality of resistors;
comparing apparatus connected to the voltage divider and generating a plurality of comparing codes based upon the first reference voltage and the plurality of input voltages; and
controlling apparatus connected to the comparing apparatus and calibrating the temperature sensor based on the plurality of comparing codes, wherein the controlling apparatus comprises a plurality of gates corresponding to the plurality of resistors, the plurality of gates being controlled by the plurality of comparing codes to calibrate the built-in temperature sensor, and only one of the plurality of gates is turned on to generate a third reference voltage with a second nositive temperature coefficient, wherein the calibrated temperature is dependent on the third reference voltage.

9. The built-in calibration device according to claim 8, wherein the plurality of comparing codes are in digital format.

10. The built-in calibration device according to claim 8, wherein the calibrated temperature sensor has a calibrated temperature and the difference between the calibrated temperature and a target temperature is within a controllable range.

11. The built-in calibration device according to claim 8, wherein the comparing apparatus includes a plurality of comparators corresponding to the plurality of input voltages, each of the plurality of comparators receiving the first reference voltage and the corresponding one of the plurality of input voltages to generate the plurality of comparing codes.

12. A calibration method for a temperature sensor, the temperature sensor generating a first reference voltage and a second reference voltage, the second reference voltage being with a first positive temperature coefficient, the calibration method comprising steps of:
(a) generating a plurality of input voltages based on the second reference voltage;
(b) comparing each of the plurality of input voltages with the first reference voltage to generate a plurality of comparing codes; and
(c) calibrating the temperature sensor based on the plurality of comparing codes, wherein the step (c) comprises:
(c1) generating a third reference voltage based on the plurality of comparing codes, the third reference voltage being with a second positive temperature coefficient; and
(c2) calibrating the temperature sensor based on the third reference voltage; wherein the calibrated temperature is dependent on the third reference voltage.

13. The calibration method according to claim 12, wherein the plurality of comparing codes are in digital format.

14. The calibration method according to claim 12, wherein the calibrated temperature sensor has a calibrated temperature and the difference between the calibrated temperature and a target temperature is within a controllable range.

* * * * *